United States Patent

Weng

[11] Patent Number: 6,034,489
[45] Date of Patent: Mar. 7, 2000

[54] ELECTRONIC BALLAST CIRCUIT

[75] Inventor: Da Feng Weng, Winchester, Mass.

[73] Assignee: Matsushita Electric Works R&D Laboratory, Inc., Woburn, Mass.

[21] Appl. No.: 08/985,068

[22] Filed: Dec. 4, 1997

[51] Int. Cl.[7] .................................................. G05F 1/00
[52] U.S. Cl. .................. 315/307; 315/244; 315/209 R; 315/247; 315/224; 315/DIG. 7; 363/34
[58] Field of Search ................................ 315/224, 244, 315/247, 209 R, 291, 307, 308, DIG. 7; 363/34, 37, 39, 47, 98, 132

[56] References Cited

U.S. PATENT DOCUMENTS

| | | | |
|---|---|---|---|
| 3,629,647 | 12/1971 | Lake | 315/59 |
| 4,564,897 | 1/1986 | Okamoto et al. | 363/132 |
| 5,283,727 | 2/1994 | Kheraluwala et al. | 363/98 |
| 5,404,082 | 4/1995 | Hernandez et al. | 315/219 |
| 5,410,221 | 4/1995 | Mattas et al. | 315/307 |
| 5,416,387 | 5/1995 | Cuk et al. | 315/209 R |
| 5,434,477 | 7/1995 | Crouse et al. | 315/209 R |
| 5,434,767 | 7/1995 | Bartarseh et al. | 363/16 |
| 5,459,651 | 10/1995 | Maehara | 363/34 |
| 5,483,127 | 1/1996 | Widmayer et al. | 315/307 |
| 5,519,289 | 5/1996 | Katyl et al. | 315/224 |
| 5,534,755 | 7/1996 | Deavenport et al. | 315/307 |
| 5,682,086 | 10/1997 | Moo et al. | 315/247 |

OTHER PUBLICATIONS

Chin S. Moo, Ying C. Chuang, Ching R. Lee, A New Power Factor Correction Circuit For Electronic Ballasts With Series–Load Resonant Inverter, 1996 IEEE, pp. 628–633.

Primary Examiner—Haissa Philogene

[57] ABSTRACT

An electronic ballast circuit includes an input section which rectifies, power factor corrects and filters an AC input voltage to provide a rectified signal. The electronic ballast circuit also includes an inverter section which receives the rectified voltage and switches the rectified voltage to provide an AC signal to a resonant load circuit. The input section includes a resonant tank circuit which provides a high frequency current to the inverter to soft switch the switches within the inverter. In the input section, an inductor is placed on the AC side of a diode bridge rectifier advantageously allowing the removal of several prior art ballast circuit components since placing this portion of the power factor correction (PFC) circuit within the input circuit on the AC side of the diode bridge rectifier allows the bridge rectifier to perform both the rectification and current blocking functions. Advantageously, this reduces the cost of the electronic ballast circuit and increases its reliability since less components are required. In addition, the switching frequency of the switches is controlled to regulate the input current, while the switching duty cycle is independently controlled to regulate the output power.

22 Claims, 8 Drawing Sheets

ELECTRONIC BALLAST CIRCUIT

TECHNICAL FIELD

This invention relates to AC-DC converters and AC-DC-AC converters with power factor correction circuits, and in particular to electronic ballast circuits for gas discharge lamps.

BACKGROUND OF THE INVENTION

In order to improve the power factor of the ballast circuit, it is well known to employ a power factor correction (PFC) circuit. Power factor is defined as the real input power level divided by the apparent power level, wherein the apparent power is defined as the RMS voltage value multiplied by the RMS current value. Thus, a system with a low power factor rating is more expensive to operate since it requires larger input current for a given real power in comparison to a system with a higher power factor. In addition, in ballast circuits with a low power factor rating the components within the ballast circuit generally have a higher power and increased size in order to handle the higher currents associated with systems having a low power factor. PFC circuitry is also used to reduce the harmonics which are coupled back onto the AC input line by the ballast circuit. There are many single stage ballast circuit topologies. Most of these circuit topologies can be classified into boost circuits, charge pump circuits, or a mix of both boost and charge pump.

The single stage boost circuit combined with an inverter is described in U.S. Pat. Nos. 4,564,897, 5,001,400 and 5,434,477. In these circuits, the boost section is used to shape the input current and the inverter section is used to convert the DC bus voltage into high frequency AC as the output for a AC-DC-AC converter. That is, the boost circuit controls the input current and the inverter controls the circuit output characteristics. Generally, the input current to the boost circuit is discontinuous. In a discontinuous current mode, it is not necessary to have a current feedback loop, stability problems are eliminated, and the line current is nearly sinusoidal. Additionally, there are no diode reverse recover problems which happen in continuous current mode and the switching power loss is relatively low. Furthermore, since a portion of the current is fed directly to the DC bus, the efficiency of the boost circuit is relatively high. However, since only a portion of the current flows through the switch (e.g., a FET) in the inverter, it is difficult to control the total harmonic distortion (THD) as the DC bus voltage in the ballast circuit approaches the peak voltage of the line.

In the single stage boost circuit, the switch components within the inverter section play two roles. First, to shape the input current, and second to control the output. In order to keep the output modulation low, the duty-cycle of the switch must be constant. However, this causes a high voltage stress on the switches and other components because in order to remain in the discontinuous current mode, the switch voltage must be at least twice the peak input voltage when the duty cycle is 50%. For example, with an AC line voltage of 277 Vrms (390 V peak) the voltage stress on the inverter switches will be about 800 V.

The charge pump circuits described in U.S. Pat. Nos. 5,459,651, 5,404,082, 5,410,221, and 5,488,269, Japanese Patent 8-186981, and in the paper entitled "*Investigation of Charge-Pump-Controlled High Power Factor Correction AC-DC Converter*" presented by Jinrong Qian and Fred C. Lee, disclose replacing the boost inductor with a capacitor. Charge pump circuits employ a high-frequency source to shape the line current and improve the THD. In a charge pump circuit, the DC bus voltage within the ballast circuit can approach the peak input voltage value, greatly decreasing the voltage stress on the inverter switches. However, the current stress on the switches increases because the switches must also handle the charge pump current.

A combination boost and charge pump circuit was disclosed by Professor Chin S. Moo at the Applied Power Electronics Conference in 1996. This circuit combines some of the advantages of the boost and charge pump circuits. The input current is partly continuous and partly discontinuous because the circuit works in both boost and charge pump modes depending upon the line input voltage level. During the boost mode, a portion of the input energy is fed directly to the DC bus of the ballast circuit. This lowers the energy storage requirements of the input capacitors, and decreases the amount of power handled by the charge pump, thereby decreasing the output modulation and lowering the current stress on the switches.

Since the combination circuit is also a charge pump, the DC bus voltage can be operated close to the input peak voltage in order to decrease the voltage stress on the inverter switches. The switches are controlled by dead-off time in order to avoid hard switching and to reduce the power loss associated with hard switching of the switches. However, this prior art technique is a relatively complicated control technique since the timing of the switches (e.g., the dead-off time) must be accurately controlled, thus increasing the cost of the control circuitry and the overall cost of the electronic ballast circuit.

Therefore, there is a need for an improved electronic ballast circuit having reduced complexity and improved switching characteristics such as softer switching.

SUMMARY OF THE INVENTION

An object of the present invention is to provide an electronic ballast control circuit which employs soft switching.

Another object of the present invention is to provide an electronic ballast circuit of reduced complexity including a power fact or correction (PFC) circuit.

A further object of the present invention is to provide an electronic ballast circuit of relatively simple construction, having a high power factor and which is relatively inexpensive to manufacture.

Briefly, according to the present invention, a combination boost and charge pump electronic ballast circuit includes an input section which rectifies, power factor corrects and filters an AC input voltage to provide a rectified signal. The electronic ballast circuit also includes an inverter section which receives the rectified voltage and switches the rectified voltage to provide an AC signal to a resonant load circuit. The input section also includes a resonant tank circuit which provides a high frequency current to the inverter to soft switch the switches within the inverter. In the input section, an inductor is placed on the AC side of a diode bridge rectifier advantageously allowing the removal of several prior art ballast circuit components since placing this portion of the power factor correction (PFC) circuit within the input circuit on the AC side of the diode bridge rectifier allows the bridge rectifier to perform both the rectification and current blocking functions. Advantageously, this reduces the cost of the electronic ballast circuit and increases its reliability since less components are required.

Positioning a portion of the PFC circuit on the AC side of the diode bridge rectifier circuit according to an aspect of the present invention, allows the PFC circuit to perform the additional function of a differential filter. That is, the PFC circuit comprises a capacitor and an inductor which perform both the differential filtering function and the PFC function.

Advantageously, the input circuit includes the resonant tank circuit which comprises an inductor $L_a$ and a capacitor $C_a$ which provide a high frequency current for softer switching (i.e., reduced electronic stress and power loss) of the inverter switches. Significantly, providing softer switching of the inverter switches reduces the complexity of the on/off switching of the inverter switches, since dead-time control (i.e., the time when the inverter switches are not conducting) is no longer required. In addition, according to another aspect of the present invention, the switching frequency of the switches is controlled to regulate the input current, while the switching duty cycle is independently controlled to regulate the output power. Significantly, by providing independent control of both the switching frequency and the duty cycle, a switching control circuit can balance the input power and the output power of the electronic ballast circuit to maintain DC bus voltage at a relatively constant value.

The topology of the present invention is not limited to electronic ballast circuits for driving lamps, rather the topology of the present invention may also be used in AC-DC converters, and AC-DC-AC converters.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
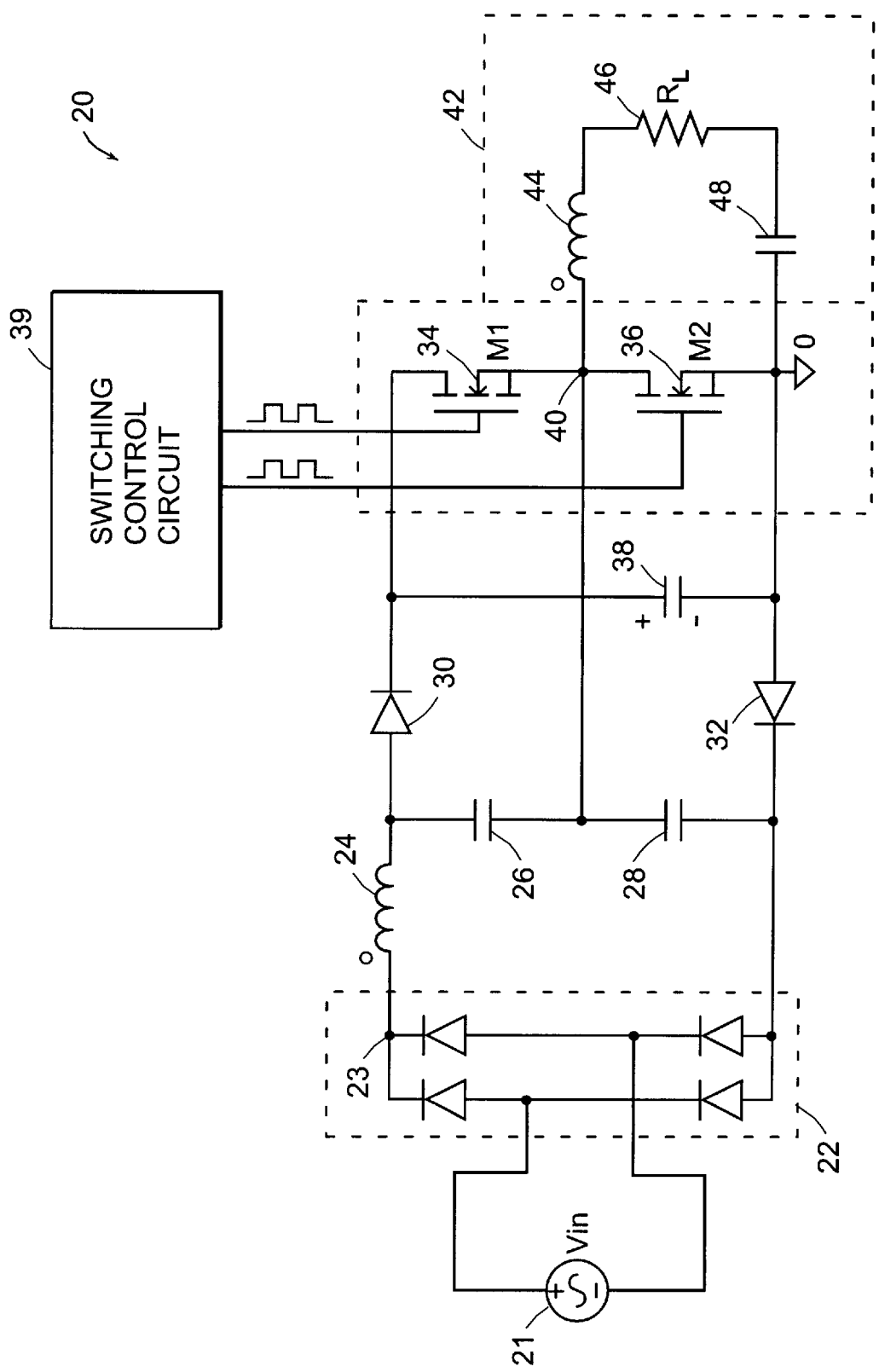
FIG. 1 illustrates a prior art electronic ballast circuit which combines boost and charge pump circuits into a single stage high power factor AC-DC-AC converter.

FIG. 1 is a schematic illustration of a prior art electronic ballast circuit 20. The circuit 20 receives an AC voltage (e.g., 120 VAC, 60 Hz) from a source 21 and as known the AC voltage is rectified by a diode bridge rectifier 22 to provide an unregulated DC voltage on a line 23. The circuit 20 also includes an inductor 24 and capacitors 26, 28 which provide a passive smoothing filter and a power factor correction (PFC) circuit. Diodes 30, 32 block current to establish the desired current paths during the switching of switches 34, 36. The circuit also includes a capacitor 38 (preferably electrolytic) whose charging and discharging is controlled by the switches 34, 36. The operation of the switches is controlled by a switching control circuit 39 in order to establish an AC voltage at node 40 which is applied to resonant circuit 42 which includes an inductor 44, load 46 (e.g., a fluorescent lamp) and a capacitor 48.

Figure 2:
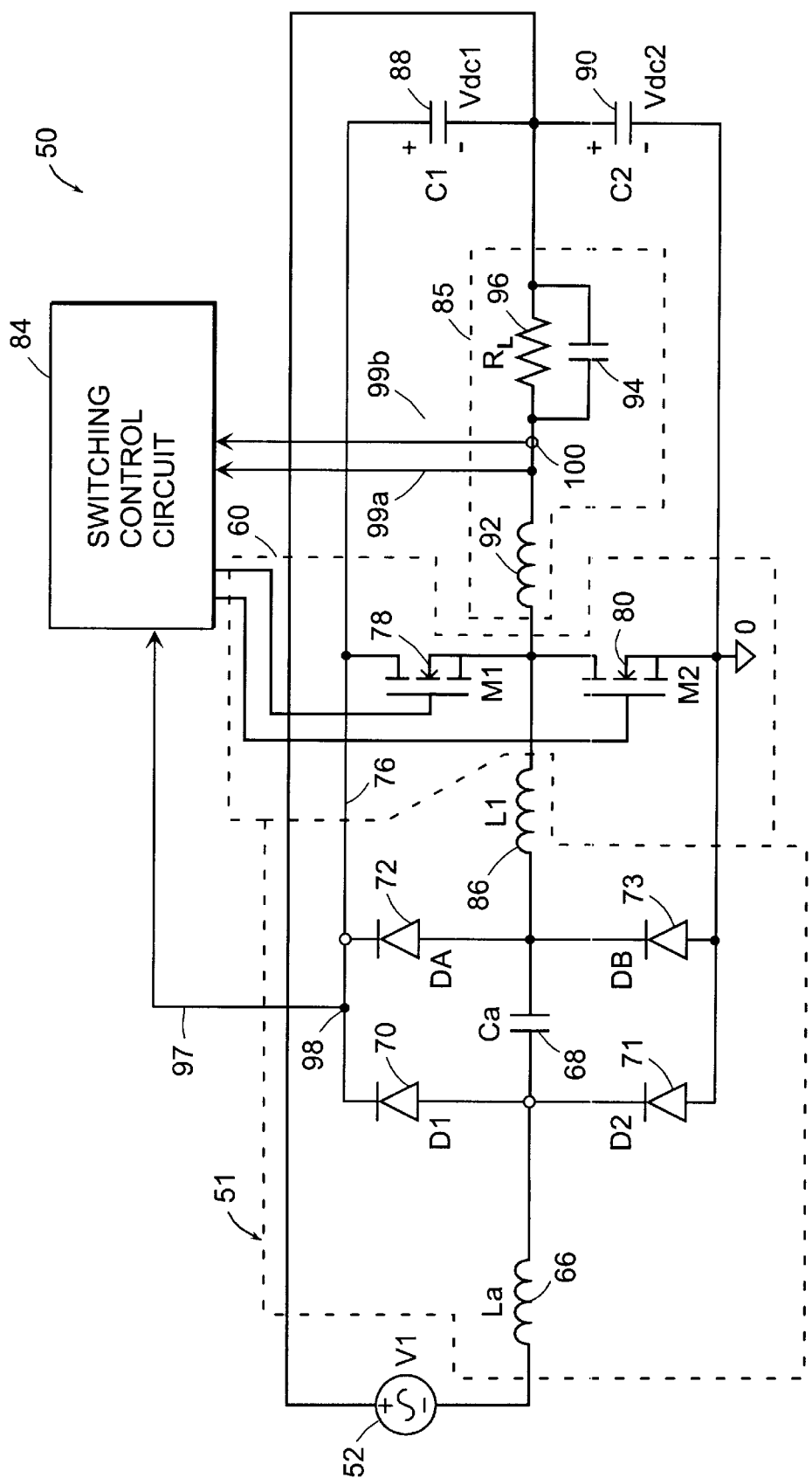
FIG. 2 is a detailed schematic illustration of an electronic ballast circuit according to the present invention.

FIG. 2 is a detailed schematic illustration of an electronic ballast circuit 50 according to the present invention. The ballast circuit 50 receives an AC voltage from a voltage source 52. The AC voltage is input to an input circuit 51 which includes an inductor $L_a$ 66, a capacitor $C_a$ 68, diodes $D_1$ 70 and $D_2$ 71, diodes $D_a$ 72 and $D_b$ 73 and inductor $L_1$ 86. The ballast circuit 50 also includes an inverter 60 comprising a plurality of switches (e.g., FETs) $M_1$ and $M_2$, 78, 80 respectively, and DC bulk storage capacitors 88, 90. The switches 78, 80 are controlled by a switching control circuit 84 which controls the frequency of the switching and the pulse width (i.e., the duty cycle) of the switching frequency. The function of the switching control circuit 84 will be discussed in detail below.

The electronic ballast circuit 50 also includes a load circuit 85 that includes an inductor 92 and a capacitor 94 which filter the drive current and voltage supplied to a gas discharge lamp, illustrated as load $R_L$ 96. The electronic ballast circuit 50 of the present invention is preferably configured to drive a high-intensity-discharge (HID) lamp with a low frequency square waveform of approximately several hundred Hz. (e.g., 200 Hz). The electronic ballast circuit may also be used to drive a fluorescent lamp, in which case the circuit would drive the lamp with a sinusoidal waveform at a much higher frequency, e.g., in the range of approximately 20–50 kHz.

Diodes $D_1$ 70 and $D_2$ 71 and capacitors 88, 90 form a doubler rectifier (the voltage at node 98 is approximately double the peak voltage from source 52). Inductor $L_a$ 66, diodes $D_a$ 72 and $D_b$ 73, capacitor $C_a$ 68 and inductor $L_1$ 86 cooperate to perform the power factor correction function. Diodes $D_1$ 70 and $D_2$ 71 are also used to block reverse current flow during the switching of the FETs 78, 80. Capacitor $C_a$ 68 and inductor $L_1$ 86 form a resonant tank circuit (the inductor $L_1$ 86 discharges the capacitor $C_a$ 68) which provides the high frequency current in response to the controlled switching of the FETs 78, 80.

The switching control circuit 84 receives a signal on a line 97 indicative of the DC back voltage at the node 98. The switching control circuit also receives signals on lines 99a, 99b indicative of the current and the voltage, respectively, at node 100. The signals on lines 97, 99a and 99b are used to control the switching frequency and the switching duty-cycle in order to regulate input current to the ballast circuit and the ballast circuit output power. In an alternative embodiment, if the load resistance remains relatively constant, then it may be possible to use one of either the signal on the lines 99a and 99b in order to determine the output power. Placing the inductor $L_a$ 66 (FIG. 2) on the AC side of the diode rectifier formed by diodes $D_1$ 70 and $D_2$ 71, allows the equivalent voltage-seconds on the inductor $L_a$ 66 to be controlled independent of the switching duty cycle applied to the switches 78, 80 by the switching control circuit 84. According to an aspect of the present invention, the switching frequency of the switches 78, 80 is controlled by the switching control circuit 84, and the frequency value is used to control the input current value. The switching duty cycle is used to control the output power. Therefore, by controlling the switching frequency and the duty cycle in response to the signals on the lines 97, 99a and 99b, the control circuit 84 balances the input power and the output power of the electronic ballast circuit to maintain the DC bus voltage at node 98 at a relatively constant value.

The resonant tank circuit formed by capacitor $C_a$ 68 and inductor $L_1$ 86 provides a high frequency current to the inverter 60 to soft switch the switches 78, 80. Advantageously, this allows the electronic ballast circuit 50 to employ circuit components with relatively low voltage ratings, and thus less expensive electronic components. Also, this circuit configuration allows the switching duty cycle of the switches 78, 80 to be used to control other circuit parameters which will be discussed below, such as the lamp current in order to regulate the output power of the ballast circuit.

Operationally, the entire switching process of the electronic ballast circuit 50 can be divided into two modes: the resonant input mode and the boost input mode. When the line voltage is low (i.e., the voltage on the capacitor $C_a$ is less than the sum of the voltage across the bulk storage capacitors 88, 90), the ballast circuit 50 operates in the resonant input mode, and there are six switching modes associated with the resonant input mode of operation. In the interest of clarity and brevity, only the positive period of the AC input voltage from the power source 52 is analyzed.

In the first mode, the switch $M_2$ 80 turns on, and if the current in inductor $L_1$ 86 is larger than the current in the differential choke $L_a$ 66, diode $D_B$ 73 turns-on (i.e., it is forward biased). This results in the input capacitor $C_a$ 68 being charged through the inductor $L_a$ 66 by the source 52 which increases the voltage across the capacitor $C_a$ 68 (but the voltage remains less than the sum of the voltage across the bulk storage capacitors 88,90, by definition of the resonant circuit mode of operation).

In the second mode, the switch $M_2$ 80 is turned off by the switching control circuit 84 and the switch $M_1$ 78 is turned on, preferably in the zero-volt-switching (ZVS) condition. The energy stored in the inductor $L_1$ 86 is then released to the DC bulk capacitors 88, 90 until the current in the inductor $L_1$ 86 decreases to zero, which causes the diode $D_B$ 73 to turn off (i.e., it reverse biases the diode 73).

In the third mode of the resonant circuit operation, due to the voltage on the capacitor $C_a$ 68, the capacitor 68 will resonate with the inductor $L_1$ 86 through the diode $D_1$ 70 and the switch $M_1$ 78, and the energy stored in the capacitor $C_a$ 68 is transferred to the inductor $L_1$ 86, and the energy stored in the inductor $L_a$ 66 is released to the bulk storage capacitor 88 through the diode $D_1$ 70.

In the fourth mode, as the voltage on the capacitor $C_a$ 68 begins to go negative, the diode $D_a$ 72 is turned on and the voltage across the capacitor $C_a$ 68 is clamped to zero. A circulating current passes through the diode $D_a$ 72, the inductor $L_1$ 86 and the switch $M_1$ 78, and the energy stored in the inductor $L_a$ 66 is released to the bulk storage capacitor 88 through the diode $D_1$ 70.

In the fifth mode, the switching control circuit commands the switch $M_1$ 78 off, and commands the switch $M_2$ 80 on, preferably in ZVS condition. The energy stored in the inductor $L_1$ 86 is then released to the bulk storage capacitors 88, 90 through the diode $D_a$ 72 and the switch $M_2$ 80. As the energy in the inductor $L_1$ 86 is released, the current in the inductor $L_1$ decreases to zero which turns the diode $D_a$ 72 off, and the energy stored in the inductor $L_a$ 66 is released to the bulk storage capacitor 88 through the diode $D_1$ 70.

In the sixth mode, while the switch $M_2$ 80 is commanded on, the capacitor $C_a$ 68 resonates with the inductor $L_1$ 86 and the current in the inductor $L_1$ 86 increases. When the current in the inductor 86 becomes greater than the current through the inductor $L_a$ 66, the diode $D_1$ 70 turns off and the switching process returns to the first mode and repeats for another cycle.

When the instantaneous input line voltage from the source 52 is high (i.e., the voltage across the capacitor $C_a$ 68 reaches the sum of the voltage across the bulk storage capacitors 88, 90), the electronic ballast circuit begins operating in the boost input mode. In this mode of operation there are seven switching modes.

The first switching mode of the boost mode begins when the switch $M_2$ 80 is commanded on by the switching control circuit 84, which initiates charging of the input capacitor $C_a$ 68 by the source 52 through the inductor $L_a$ 66. The voltage on the capacitor $C_a$ 68 increases until it reaches a value equal to the sum of the voltage across the bulk storage capacitor 88, 90.

In the second switching mode, once the voltage across the capacitor $C_a$ 68 is higher than the sum of the voltage across the bulk storage capacitors 88, 90, the diode $D_1$ 70 turns on and the energy stored in the inductor $L_a$ 66 releases to the bulk storage capacitor 88. There is also a circulating current which passes through the diode $D_b$ 73, the inductor $L_1$ 86 and the switch $M_2$ 80.

In the third switching mode of the boost mode, the switching control circuit 84 commands the switch $M_2$ 80 off and the switch $M_1$ 78 on. The energy stored in the inductor $L_1$ 86 is then released to the DC bulk capacitors 88, 90 and the current in the inductor $L_1$ 86 decreases to zero. In response, the diode $D_b$ 73 turns off while the inductor $L_a$ 66 is still releasing its stored energy to the bulk storage capacitor 88 through the diode $D_1$ 70.

In the fourth switching mode of the boost mode, due to the voltage on the capacitor $C_a$ 68, the capacitor 68 resonates with the inductor $L_1$ 86 through the diode $D_1$ 70 and the switch $M_1$ 78. The energy stored in the capacitor $C_a$ 68 is transferred to the inductor $L_1$ 86 and energy stored in the inductor $L_a$ 66 continues to be transferred to the bulk storage capacitor 88 through the diode $D_1$ 70.

In the fifth switching mode, the voltage across the capacitor $C_a$ 68 becomes less than zero which turns the diode $D_a$ 72 on. This clamps the voltage on the capacitor $C_a$ 68 to zero, and a circulating current passes through the diode $D_a$ 72, the inductor $L_1$ 86 and the switch $M_1$ 78. The energy stored in the inductor $L_a$ 66 continues to be released to the bulk storage capacitor 88 through the diode $D_1$ 70.

In the sixth switching mode of the boost input mode, the switching control circuit 84 commands the switch $M_1$ 78 off, and the switch $M_2$ 80 on. The energy stored in the inductor $L_1$ 86 is then released to the bulk storage capacitors 88, 90 through the diode $D_a$ 72 and the switch $M_2$ 80. Once the current through the inductor $L_1$ 86 decreases to zero, the diode $D_a$ 72 turns off. The energy stored in the inductor $L_a$ 66 then continues to be released to the bulk storage capacitor 88 through the diode $D_1$ 70.

In the seventh switching mode, the control circuit commands the switch $M_2$ 80 on. The capacitor 68 then resonates with the inductor $L_1$ 86, and the current in the inductor $L_1$ 86 increases. Once the current in inductor 86 becomes higher than the current in inductor $L_a$ 66, the diode $D_1$ 70 turns off and the switching process returns to the first mode of the boost circuit operation and repeats.

From the operating principle of the circuit, we know that during the switching period, even though the input voltage to the electronic ballast circuit is constant, the voltage on the input inductor $L_a$ 66 is still variable. The voltage on the inductor $L_a$ 66 can decrease to zero, as the voltage on the capacitor $C_a$ 68 is equal to the input voltage plus Vdc1 (or Vdc2), which is the voltage across capacitor $C_1$ 88 (or $C_2$ 90). Because of the PFC function provided by the input circuit, the input impedance of the electronic ballast circuit can be considered as a resistor, and therefore, the input current is linear with respect to the input voltage (i.e., the input current follows the input voltage). For a fixed value of the input capacitor $C_a$ 68, the higher the input voltage, the faster the voltage increases across the capacitor $C_a$ 68, and the shorter the excitation time of the inductor $L_a$ 66.

In mode 1 both the resonant input mode and boost mode, the capacitor $C_a$ 68 is charged by the instantaneous input voltage through the inductor $L_a$ 66. Accordingly, the voltage $V_{La}(t)$ exciting the input inductor $L_a$ 66 is equal to:

$$V_{La}(t)=V_{in}(t)+V_{dc2}-V_{ca}(t) \quad \text{(Eq. 1)}$$

where:
- $V_{in}(t)$ is the voltage supplied by the source 52;
- $V_{dc}2$ is the voltage across the bulk storage capacitor 90;
- $V_{ca}(t)$ is the voltage across the capacitor $C_a$ 68; and
- t is time.

The voltage across the capacitor $C_a$ 68 can be expressed as:

$$V_{ca}(t) = \left( \frac{V_{in}(t)}{C_a \cdot R_{equ}} xt \right) + V_{ca}(0) \quad \text{(Eq. 2)}$$

where:
- $R_{equ}$ is the equivalent input resistance of the input circuit 51; and
- $V_{ca}(0)$ is the initial voltage (i.e., the voltage at t=0) across the capacitor $C_a$.

The excitation volt-second $V_{DT}$ on the input inductor $L_a$ 66 can be expressed as:

$$V_{DT} = C_a \cdot R_{equ} \frac{[V_{in} + V_{dc2} - V_{ca(0)}]^2}{2V_{in}} \quad \text{(Eq. 3)}$$

The expression of the excitation volt-second $V_{DT}$ on the input inductor $L_a$ 66 demonstrates that $V_{DT}$ is changed with the instantaneous input voltage $V_{in}(t)$. That is, as the instantaneous voltage is low, the volt-second $V_{DT}$ is high, and as the instantaneous voltage is high, the volt second $V_{DT}$ is low.

We can also express the equivalent duty cycle $D_{equ}$ as:

$$D_{equ} = C_a \cdot R_{equ} \cdot F_s \cdot \frac{[V_{in} + V_{dc2} - V_{ca(0)}]^2}{2V_{in}(V_{in} + V_{dc2})} \quad \text{(Eq. 4)}$$

where:
- $F_s$=switching frequency

The expression of the equivalent duty-cycle shows that $DT_{equ}(t)$ changes as a function of the input line voltage $V_{in}(t)$.

Referring to Eq. 4, in the voltage-second calculation the switching duty-cycle is not a factor, and therefore the duty cycle is not a factor in the voltage-second control. The switch turn-on or off control provides a high frequency current source to discharge the energy stored in the input capacitor $C_a$ 68 and transfer the energy to the bulk storage capacitor 88, 90.

Figure 3:
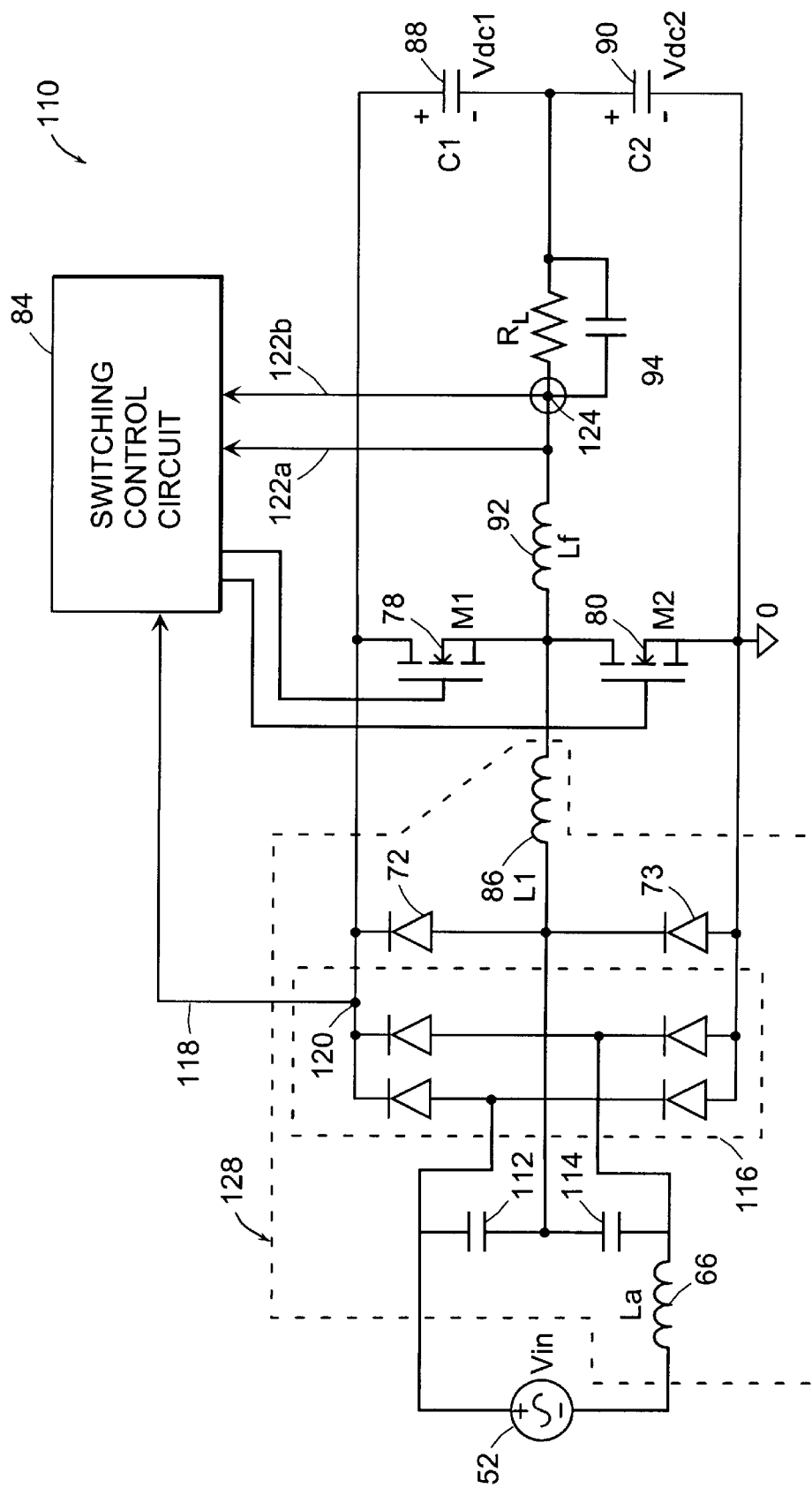
FIG. 3 is a detailed schematic illustration of an alternative embodiment electronic ballast circuit.

FIG. 3 is a single phase half-bridge AC-DC-AC converter 110 configured as an electronic ballast circuit to drive a lamp. The converter 110 is substantially similar to the electronic ballast circuit 50 set forth in FIG. 2, with the exception of the addition of several filtering capacitors 112, 114 (each approximately 10 nf) and the use of a full wave rectifier 116. Notably, the converter 110 includes an input section 128 which rectifies, filters and power factor corrects the input voltage from the source 52. Similar to the circuit illustrated in FIG. 2, the switching control circuit 84 receives a signal on a line 118 indicative of the voltage at node 120, a signal on a line 122*a* indicative of the voltage at node 124 and a signal on a line 122*b* indicative of the current at the node 124. The switching control circuit uses these feedback signals to regulate the switching frequency and duty-cycle. Specifically, the switching frequency is used to control the input current to the converter 110 from the source 52, while the switching duty-cycle is used to regulate the output power. In addition, the current source established by the inductor 86 facilitates soft switching of the switches 78, 80. In a preferred embodiment, the components of the converter 110 have the following value:
- $L_a$=1.2 mH;
- Capacitors 112 and 114=10 nf each;
- $L_1$=200 $\mu$H;
- $L_f$=1.5 mH;
- Capacitor 94=2.1 nf; and
- $C_1=C_2$=100 $\mu$f.

Figure 4:
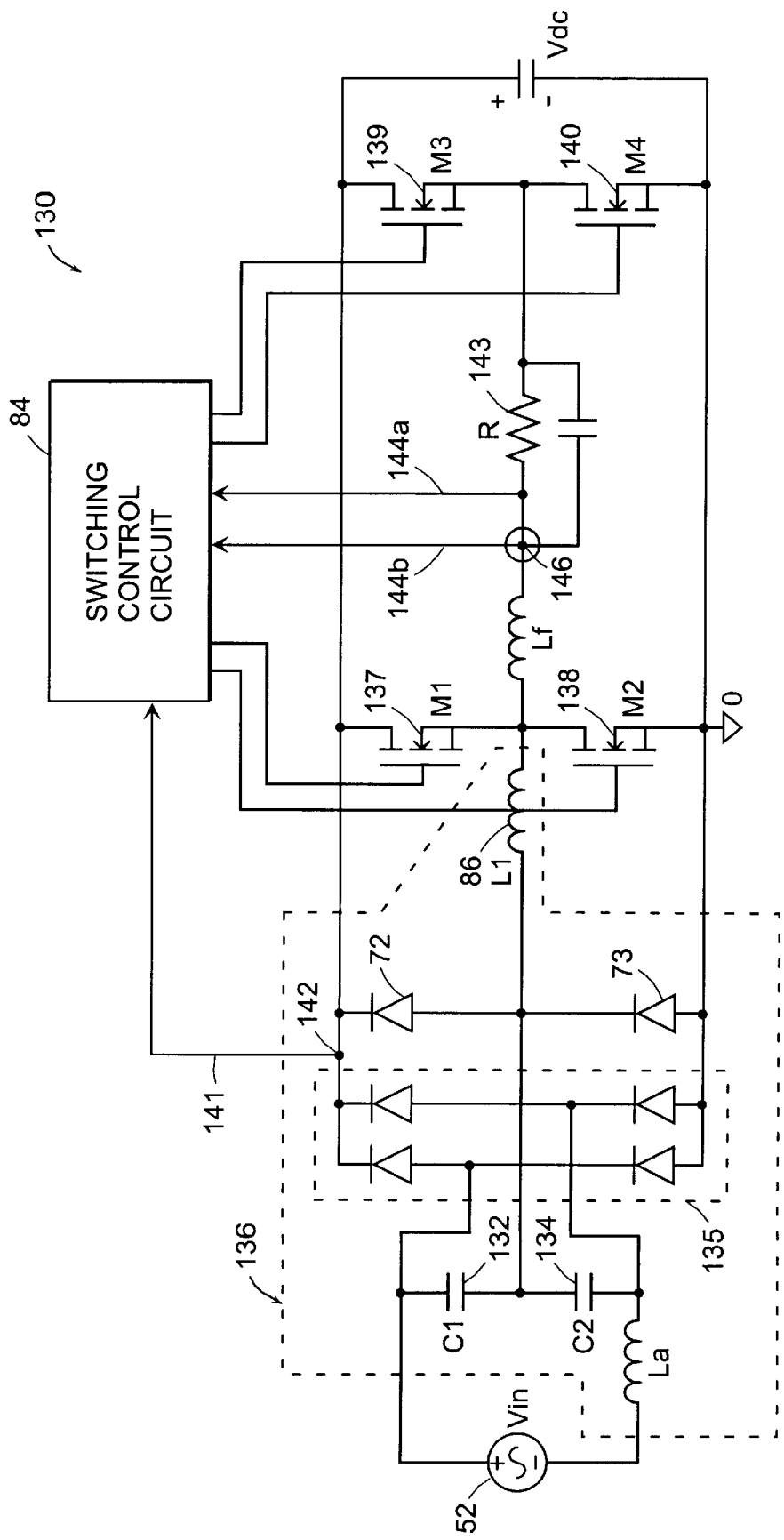
FIGS. 4–8 illustrate various alternative embodiments according to the present invention.

FIG. 4 illustrates a single phase full-bridge single stage AC-DC-AC converter 130 also configured to operate as an electronic ballast. The converter 130 is substantially similar to the electronic ballast circuit 110 illustrated in FIG. 3, with the exception of a full-bridge inverter comprising four switching FETs 137–140. Switches 137, 138 operate at a relatively high variable switching frequency (e.g., 40–50 kHz) and a variable duty cycle, and switches 139, 140 operate at a lower constant switching frequency (e.g., 200 Hz) at a fixed duty cycle (e.g., 50%) to provide a low frequency square waveform to the lamp. The circuit 130 is suitable for low AC input voltage applications such as driving a HID lamp (represented by load 143) since the full DC back voltage (measured from node 142 to ground) is applied to the lamp.

The input section 136 rectifies, filters and power factor corrects the input voltage from the source 52. The switching control circuit 84 receives a signal on a line 141 indicative of the voltage at node 142, a signal on a line 144*a* indicative of the voltage at node 146 and a signal on a line 144*b* indicative of the current at the node 146. The switching control circuit 84 uses these feedback signals to regulate the switching frequency and duty-cycle of switches 137, 138. The switching frequency is used to control the input current, while the switching duty-cycle is used to regulate the output power of the converter 130. In addition, the current source established by the inductor $L_1$ 86 facilitates soft switching of the switches 137, 138.

Figure 5:
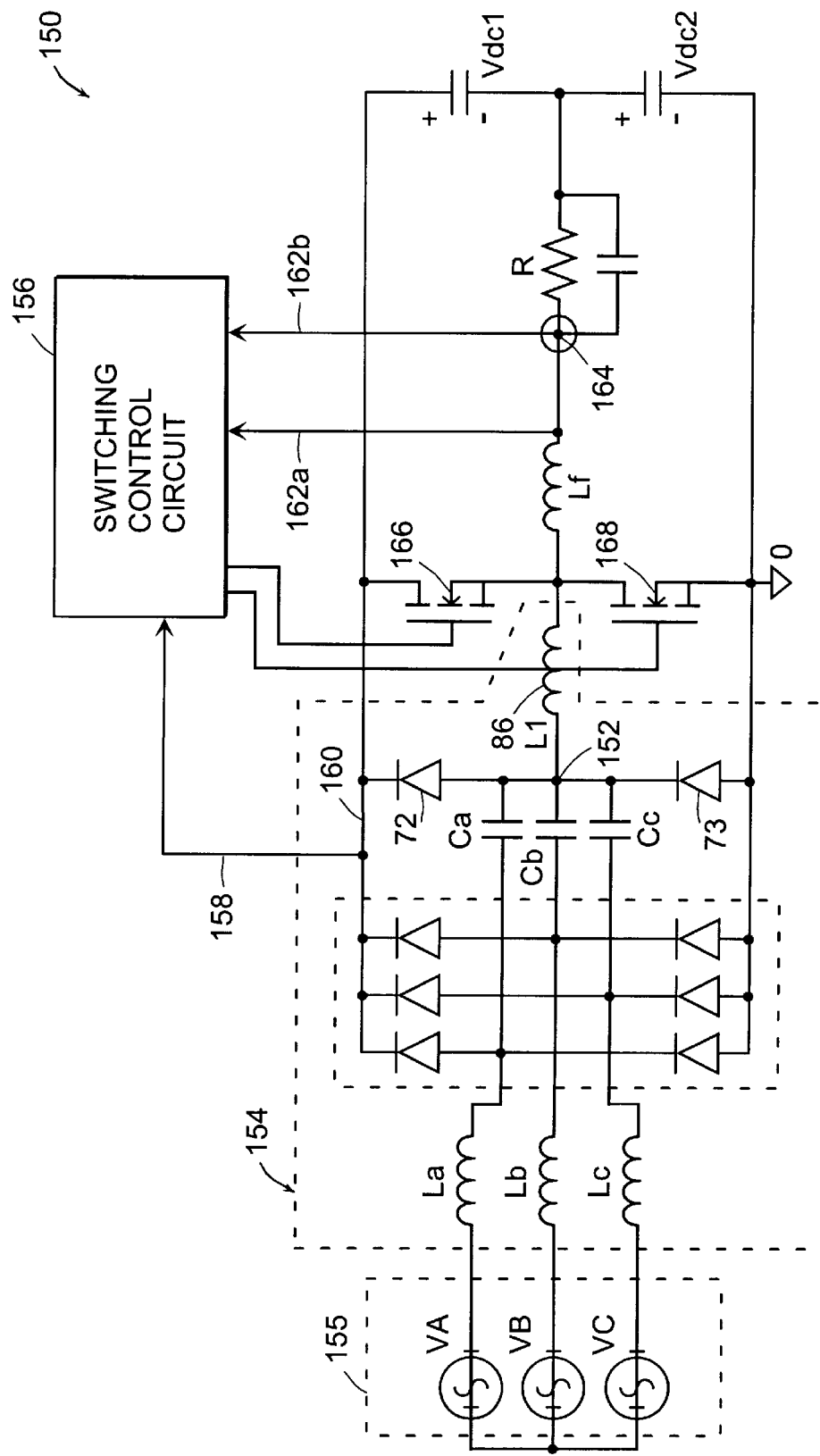

FIG. 5 illustrates a three phase half-bridge single stage AC-DC-AC converter 150 also suitable for use as an electronic ballast circuit for driving a lamp. The current from each of the three phases is summed at node 152. This converter also includes an input section 154 which rectifies, filters and power factor corrects the input voltage from a three phase source 155. Switching control circuit 156 receives a signal on a line 158 indicative of the voltage at node 160, a signal on a line 162*a* indicative of the voltage at node 164 and a signal on a line 162*b* indicative of the current at the node 164. The switching control circuit 156 uses these feedback signals to regulate the switching frequency and duty-cycle of the control signals applied to switches 166, 168. Specifically, the switching frequency is used to control the input current to the converter 150 from the source 155, while the switching duty-cycle is used to regulate the output power. In addition, the current source established by the inductor $L_1$ 86 facilitates soft switching of the switches 166, 168.

Figure 6:
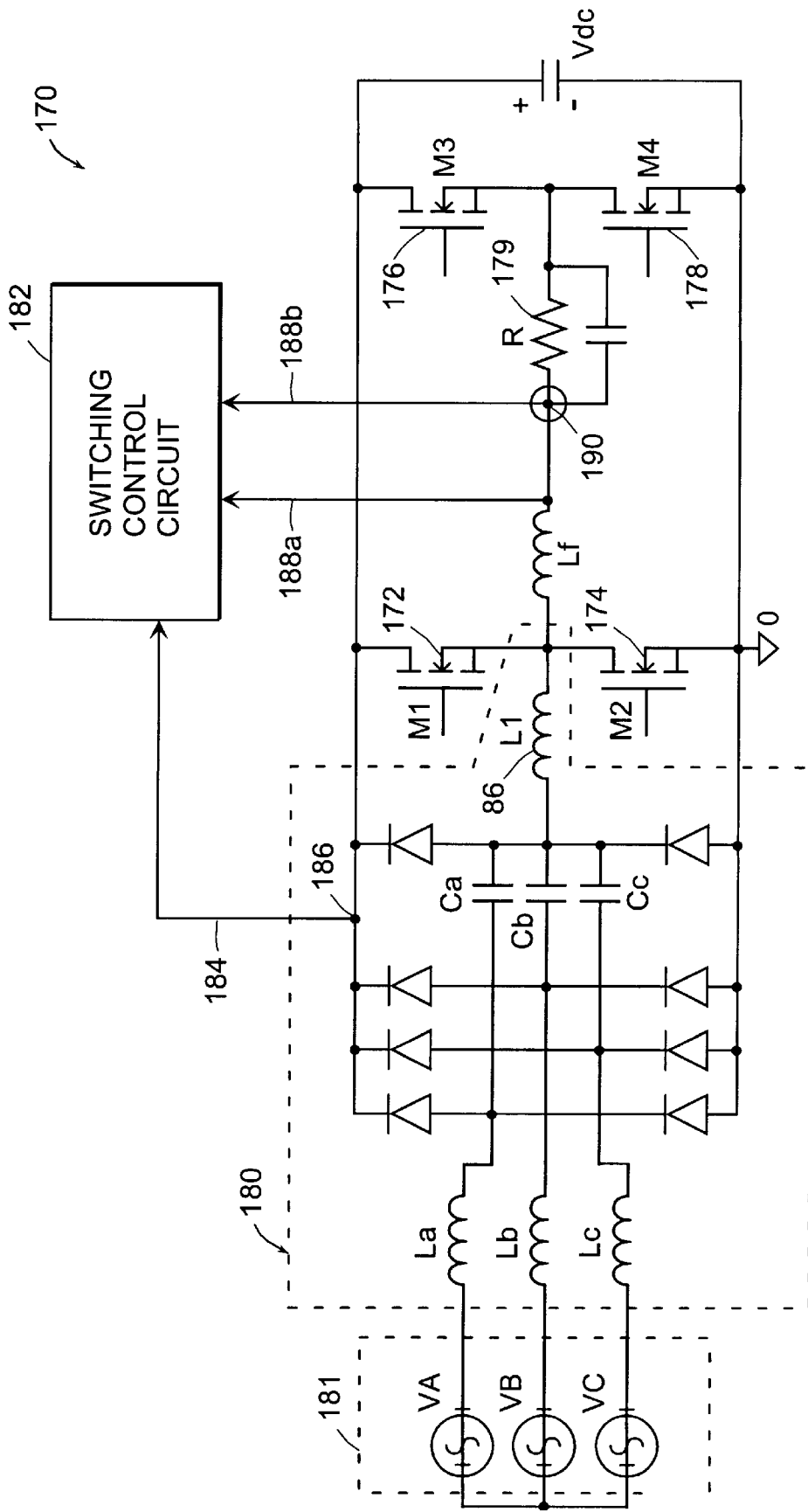

FIG. 6 illustrates a three phase full-bridge single stage AC-DC-AC converter 170 whose control principle is the same as the circuit illustrated in FIG. 4. Switches 172, 174 operate at a relatively high variable switching frequency (e.g., 40–50 kHz), and switches 176, 178 operate at a lower constant switching frequency (e.g., 200 Hz) at a fixed duty cycle (e.g., 50%) to provide a low frequency square waveform to the lamp. The circuit 170 is suitable for low AC input voltage applications, such as driving a HID lamp (represented by load 179). The circuit 170 includes an input section 180 which rectifies, filters and power factor corrects the input voltage from the source 181. Switching control circuit 182 receives a signal on a line 184 indicative of the voltage at node 186, a signal on a line 188a indicative of the voltage at node 190 and a signal on a line 188b indicative of the current at the node 190. The switching control circuit 182 uses these feedback signals to regulate the switching frequency and duty-cycle of switches 172, 174. The switching frequency is used to control the input current, while the switching duty-cycle is used to regulate the output power of the converter 170. In addition, the current source established by the inductor $L_1$ 86 facilitates soft switching of the switches 172, 174. In the interest of clarity, the connections between the switches 172, 174, 176 and 178 and the switching control circuit 182 are not shown. This circuit is suitable for low input AC voltage applications since the full DC back voltage is applied to the lamp.

Figure 7:
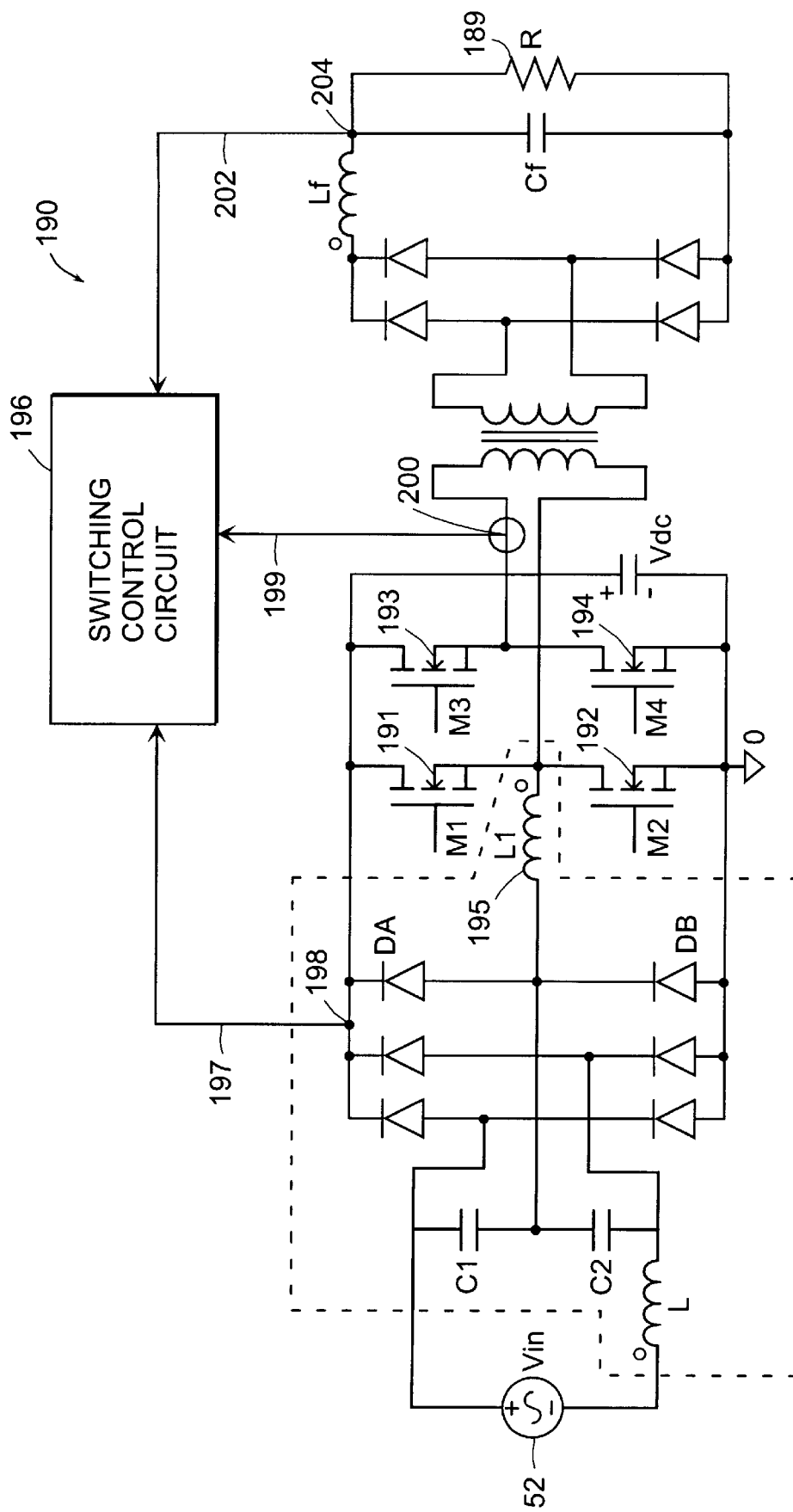

FIG. 7 illustrates a single phase full-bridge type single stage AC-DC-DC converter 190 which receives an input voltage from source 52. In the circuit, switches 191–194 operate at a relatively high switching frequency (e.g., 100–200 kHz). The output voltage at load 189 is controlled by the relative phase shift between the lagging leg of the full bridge formed by the switches 191, 192 and the leading leg of the bridge which includes the switches 193, 194. Due to the high frequency current provided by current source inductor $L_1$ 195, the switches 191–194 in both the leading and lagging legs operate in soft switching condition.

The duty cycle of each of the switches 191–194 remains constant at 50%. Switching control circuit 196 controls the switching signals in order to provide the relative phase shift between the switching signals applied to the leading and lagging legs of the full bridge. The switching control circuit receives a signal on a line 197 indicative of the voltage at node 198. The control circuit also receives a signal on a line 199 indicative of the current through node 200, and a signal on a line 202 indicative of the voltage at node 204, in order to determine the output power of the circuit. The control circuit uses the signal on the line 197 to control the frequency of the switching signal applied to each of the switches 191–194, in order to regulate the input current. In order to increase the input current, the control circuit decreases the frequency. Using the signals on the lines 199 and 202, the control circuit 196 adjusts the relative phase shift between the signals applied to the leading and lagging legs in order to control the output power. In order to increase the output power, the phase shift is decreased. Similarly, in order to decrease the output power, the control circuit increases the relative phase shift between the leading and lagging legs.

Figure 8:
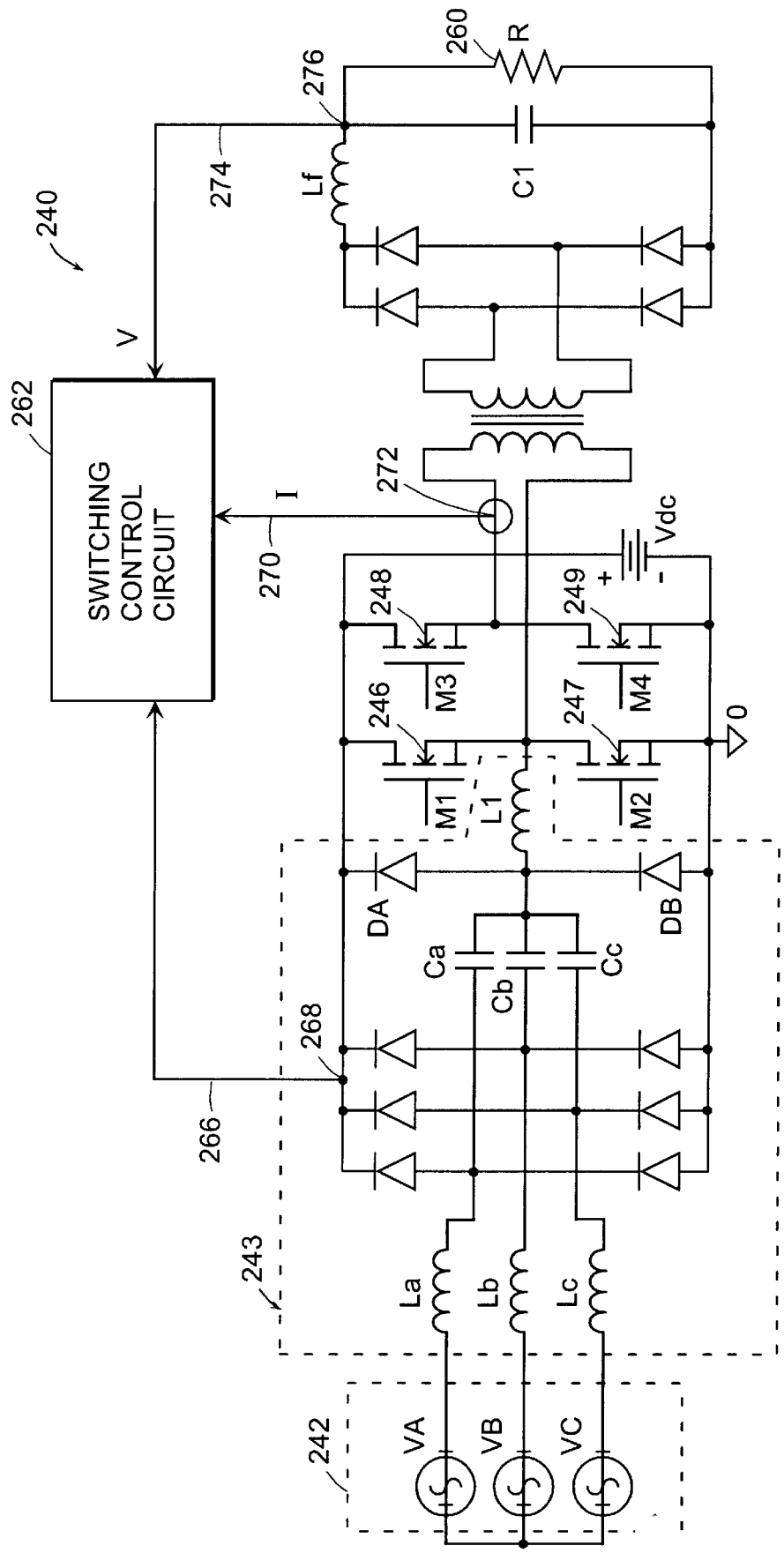

FIG. 8 illustrates a three phase full-bridge type single stage AC-DC-DC converter 240. Similar to the other circuit embodiments disclosed herein, the converter includes an input section 243 which rectifies, filters and power factor corrects the input voltage from a source 242. The operation of the converter 240 is substantially the same as the circuit illustrated in FIG. 7, with the exception that the converter 240 (FIG. 8) receives a three-phase input. Switches 246–249 operate at a relatively high switching frequency (e.g., 100–200 kHz). The output voltage applied to load 260 is controlled by the relative phase shift between the lagging leg (switches 246, 247) and leading leg (switches 248, 249) of the bridge.

Switching control circuit 262 regulates the relative shaft shift between the switching signals applied to the leading and lagging legs of the full bridge. In the interest of clarity of illustration, the signals from the switching control circuit 262 to the switches 246–249 are not shown. The switching control circuit 262 receives a signal on a 266 indicative of the voltage at node 268. The control circuit also receives a signal on a line 270 indicative of the current through node 272, and a signal on a line 274 indicative of the voltage at node 276, in order to determine the output power of the circuit. The control circuit uses the signal on the line 266 to control the frequency of the signal applied to each of the switches in order to regulate the input current. To increase the input current, the control circuit 262 decrease the switching frequency. Using the signals on the lines 270 and 274, the control circuit 262 adjusts the relative phase shift between the signals applied to the leading and lagging legs in order to control the output power. The control circuit increases the phase shift in order to decrease the output power. Similarly, in order to increase the output power, the control circuit decreases the relative phase shift between the leading and lagging legs.

One of ordinary skill will recognize, if the load resistance is relatively constant, then either the voltage or the output current may be read (rather than both) in order to determine the output power.

Although the present invention has been shown and described with respect to several preferred embodiments thereof, various changes, omissions and additions to the form and detail thereof, may be made therein, without departing from the spirit and scope of the invention.

What is claimed is:

1. An electronic ballast circuit which receives an AC input voltage from a source and provides an AC output voltage to a load, said ballast circuit comprising:

A. An input circuit including:
      a power factor correction circuit which receives the AC input voltage and provides a filtered AC input voltage,
      a rectifier circuit for rectifying the filtered input voltage and thereby providing an unregulated DC voltage, wherein the power factor correction circuit includes a first inductor connected in series between the source and the rectifier circuit;
      a resonant circuit including a series-connected capacitor and a second inductor
   B. a load circuit;
   C. an inverter circuit comprising switching means responsive to the unregulated DC voltage for switching the unregulated DC voltage under the control of a switching control signal to provide the AC output voltage to the load, the resonant circuit is being connected between the rectifier circuit and the inverter circuit;
   D. first and second diodes, the junction of said first inductor end and said capacitor being connected to the anode of the first diode and the cathode of the second diode, wherein the first and second diodes limit the voltage on said capacitor to a single polarity; and
   E. a control circuit which responds to a signal indicative of the unregulated DC voltage and a signal indicative of the power applied to the load, and provides said switching control signal, wherein said control circuit controls the frequency of said switching control signal to regulate the input power to said ballast circuit and uses the signal indicative of the power applied to said load to control the duty cycle of the switching control signal and thereby to regulate the output power of the ballast circuit.

2. The electronic ballast circuit of claim 1, wherein said rectifier circuit comprises a diode bridge rectifier.

3. The electronic ballast circuit of claim 1, wherein said means for switching comprises a plurality of field effect transistors.

4. The electronic ballast circuit of claim 3 wherein said means for switching is configured as a half-bridge switching network.

5. The electronic ballast circuit of claim 3 wherein said means for switching is configured as a full-bridge switching network.

6. The electronic ballast circuit of claim 3, wherein said inductor $L_1$ includes a first lead connected to a source node of a first field effect transistor and to a drain node of a second field effect transistor, wherein said first and second field effect transistors form a half bridge.

7. The electronic ballast circuit of claim 1 wherein said load circuit includes a lamp load disposed electrically parallel to a load capacitor, wherein both said load capacitor and said lamp load are both electrically in series with a load inductor.

8. The electronic ballast circuit of claim 7, wherein said control circuit receives a signal indicative of the voltage applied to said lamp load which is indicative of the power applied to said load circuit.

9. The electronic ballast circuit of claim 8, wherein said control circuit also receives a signal indicative of the current through said load circuit.

10. The electronic ballast circuit of claim 6 wherein said switching control signal is connected to a gate of said first field effect transistor and to a gate of said second field effect transistor.

11. The electronic ballast circuit of claim 1, wherein said inductor $L_a$ includes a first lead which receives the AC voltage signal and a second lead connected to said capacitor $C_a$ of said resonant circuit, and wherein said rectifier circuit includes a first diode $D_1$ having an anode connected to said second lead of said inductor $L_a$ and a second diode $D_2$ whose cathode is connected to said second lead of said inductor $L_a$.

12. The electronic ballast circuit of claim 1, wherein said control circuit receives a current signal indicative of the current through said load circuit, and a voltage signal indicative of the voltage across said load circuit.

13. The electronic ballast circuit of claim 1, wherein said AC signal applied to said load circuit is a low frequency squarewave.

14. The electronic ballast circuit of claim 1, wherein said AC signal applied to said load circuit is a sine wave.

15. The electronic ballast circuit of claim 4, wherein the AC voltage signal is a three phase AC voltage signal.

16. The electronic ballast circuit of claim 4, wherein the AC voltage signal is a single phase AC voltage signal.

17. The electronic ballast circuit of claim 5, wherein the AC voltage signal is a three phase AC voltage signal.

18. The electronic ballast circuit of claim 5, wherein the AC voltage signal is a single phase AC voltage signal.

19. An electronic ballast circuit which receives an AC input voltage from a source and provides an AC output voltage to a load, said ballast circuit comprising:

A. Input circuit means, including:
    means for correcting the power factor of the AC input and providing a filtered AC voltage,
    a rectifier circuit for rectifying the AC input to provide an unregulated DC voltage,
    a first inductor having a first lead connected to a first lead of the source and a second lead connected to the rectifier circuit,
    a first capacitor having a first lead connected to the second lead of the first inductor,
    a second capacitor having a first lead connected to a second lead of the first capacitor and a second lead connected to a second lead of the input source B. a load circuit;

C. an inverter circuit comprising switching means responsive to the unregulated DC signal for switching the unregulated DC signal under control of a switching control signal to provide the AC output to said load;

D. a second inductor connected between said second lead of said first capacitor and said inverter circuit, said second inductor and said capacitors forming a resonant circuit, said resonant circuit being connected between said rectifier circuit and said inverter circuit; and E. a control circuit responding to a signal indicative of the unregulated DC voltage and a signal indicative of the power applied to said load circuit, and controlling the frequency of the switching control signal to regulate the input power to said ballast circuit and controlling the duty cycle of the switching control signal to regulate the output power of the ballast circuit.

20. The electronic ballast circuit of claim 19, wherein said input circuit means includes a diode bridge rectifier.

21. The electronic ballast circuit of claim 19, wherein said input circuit means includes a first diode having an anode connected to said first lead of said second capacitor;

a second diode having a cathode connected to said first lead of said second capacitor, and an anode connected to a ground node; and an inductor $L_1$ having a first lead connected to said cathode of said second diode and to said anode of said first diode.

22. The electronic ballast circuit of claim 21 wherein said switching means includes a first transistor and a second transistor which form a half bridge switching network, wherein a second lead of said inductor $L_1$ is connected to a node disposed between said first transistor and said second transistor.

* * * * *